United States Patent
Nishijima et al.

(10) Patent No.: US 6,848,828 B2
(45) Date of Patent: Feb. 1, 2005

(54) FOIL BEARING AND SPINDLE DEVICE USING THE SAME

(75) Inventors: Hidehiko Nishijima, Iwata (JP); Yoshio Fujikawa, Iwata (JP)

(73) Assignee: NTN Corporation, Osaka (JP)

( * ) Notice: Subject to any disclaimer, the term of this patent is extended or adjusted under 35 U.S.C. 154(b) by 69 days.

(21) Appl. No.: 10/377,757

(22) Filed: Mar. 4, 2003

(65) Prior Publication Data
US 2003/0169951 A1 Sep. 11, 2003

(30) Foreign Application Priority Data

Mar. 8, 2002 (JP) ........................................ 2002-063001
Mar. 20, 2002 (JP) ........................................ 2002-077847

(51) Int. Cl.[7] .............................................. F16C 32/06
(52) U.S. Cl. ...................................... 384/106; 384/103
(58) Field of Search ................................ 384/103–106

(56) References Cited

U.S. PATENT DOCUMENTS

| 4,082,375 A | * | 4/1978 | Fortmann | 384/105 |
| 4,514,458 A | * | 4/1985 | Thorn et al. | 428/222 |
| 4,559,249 A | * | 12/1985 | Arigaya et al. | 384/907 |
| 4,865,466 A | * | 9/1989 | Jones | 384/103 |
| 5,114,244 A | * | 5/1992 | Dunham et al. | 384/103 |

FOREIGN PATENT DOCUMENTS

| JP | 58-87343 | 7/1979 |
| JP | 56-163775 | 12/1981 |
| JP | 09-173913 | 7/1997 |
| JP | 10-331846 | 12/1998 |
| JP | 10-331847 | 12/1998 |

* cited by examiner

*Primary Examiner*—Thomas R. Hannon

(57) ABSTRACT

A foil bearing is provided, which is simple in structure, has a large load capacity and a large damping capability and can therefore allow a rotary shaft having a large unbalance as compared with the conventional bearing to be driven stably at a high speed. A spindle device utilizing such foil bearing is also provided, which is designed to increase the permissible amount of unbalance and also to have a light-weight feature. Each of the foil bearings 504 and 505 includes an elastic member 2 prepared from a wire net formed by braiding wires, and a thin bearing foil 3 supported by the elastic member 2 and defining an elastic bearing surface S. The respective foil bearing 504 and 505 is used at least as a radial bearing 504 in the spindle device including a rotary shaft 4 having a head mount 501*a,* on which an atomizer head is mounted, and the radial and thrust bearings 504 and 505 for rotatably supporting the rotary shaft 4.

18 Claims, 13 Drawing Sheets

PRIOR ART

FOIL BEARING AND SPINDLE DEVICE USING THE SAME

BACKGROUND OF THE INVENTION

1. Field of the Invention

The present invention generally relates to a foil bearing which is one of the fluid bearings used in various machines and equipments and, more particularly, to the foil bearing suitable for supporting a rotary shaft of a kind used in machines and equipments requiring a high speed rotation of the rotary shaft, such as, in particular, a turbo machines including a turbo compressor, an expansion turbine and a gas turbine, and an electrostatic painting device of a rotary atomizing type, and also to a spindle device using the foil bearing and having the rotary shaft on which an atomizer head is mounted, for example, a high speed spindle device for use in a rotary atomizer for atomizing a liquid medium by the effect of a centrifugal force.

2. Description of the Prior Art

The rotary atomizer for atomizing, by the effect of a centrifugal force, a liquid medium supplied to a disk-shaped atomizer head then rotating at high speeds is generally known as used in an electrostatic painting machine of a rotary atomizer type for atomizing a painting material, a powder making machine, a spray drier and so on. The powder making machine is an apparatus in which a molten metal or the like is atomized under an atmosphere rich of an inert gas and is quickly cooled to provide atomized particles of the metal. The spray drier is used to manufacture a powder by atomizing a solution containing food materials or medicines in a hot blast to provide finely divided particles.

Hereinafter, reference will be made to the electrostatic painting machine of the rotary atomizer type for the discussion of prior art relevant to the present invention. In the electrostatic painting machine of the rotary atomizer type, while a rotary shaft having an atomizer head mounted on a free end thereof is driven at a high speed, a painting material is supplied to the atomizer head so that the painting material can be atomized by the effect of a centrifugal force. As bearings for rotatably supporting the rotary shaft, rolling bearings have hitherto been employed. However, the use of the rolling bearings have brought about problems associated with the lifetime which often decreased as a result of high speed rotation of the rotary shaft within an atmosphere rich of solvent gases and also with contamination of the painting material in contact with a lubricating oil leaking from the bearings. Accordingly, in order to alleviate those problems, air bearings have now come to be suggested and used in practice in place of the rolling bearings.

Some of the spindle devices used in the electrostatic painting machines utilizing the air bearings are shown in FIGS. 16 and 17. The spindle device shown in FIG. 16 is of a type in which externally pressurized air bearings that are supplied a compressed air from an external source are employed, and is disclosed in, for example, the Japanese Laid-open Patent Publication No. 9-173913. As shown therein, the spindle device includes a housing 561 having an axially extending internal bore 561a defined therein, in which a rotary shaft 567 and a turbine rotor 568 mounted on a rear end of the rotary shaft 567 for generating a rotational force are operatively accommodated through a bearing gap 566. A radial air bearing 569 is defined between the periphery of the rotary shaft 567 and air supply nozzles 564, while a thrust air bearing 570 is defined between the turbine rotor 568 and air supply nozzles 565. In this structure, when a compressed air is supplied into the bearing gap through the air supply nozzles 564 and 565, the rotary shaft 567 and the turbine rotor 568 are supported afloat by the effect of the pressure of the compressed air in a non-contact fashion relative to the housing 561 and, thus, externally pressurized air bearings including the radial air bearing 569 and the thrust air bearing 570 deploy their intrinsic function.

On the other hand, a plurality of turbine blades 579 are arranged on an outer peripheral face of the turbine rotor 568 on the rear end of the rotary shaft 567, while the housing 561 is formed with a compressed air supply port 580 that is communicated with an air compressor 581 for blowing the compressed air towards the turbine blades 579 in a direction substantially tangential to the turbine rotor 568. In this structure, when and so long as the compressed air is supplied from the compressor 581 to the turbine blades 579 through the compressed air supply port 580, the rotational force is applied to the turbine blades 579 and, hence, the rotary shaft 567 then supported afloat can be driven at a high speed.

A paint atomizer head 573 is mounted on a front end of the rotary shaft 567 for rotation together therewith and, hence, the painting material sprayed from the atomizer nozzle 577 is introduced towards an inner peripheral surface of a cup-shaped guide plate 574 through a discharge port 578 and is then atomized outwardly by the effect of a centrifugal force developed by a high speed rotation of the atomizer head 573. In such case, if the atomizer head 573 is electrostatically charged, the paint material when flowing in contact with the inner peripheral surface of the guide plate 574 can be charged to a negative charge and can then be deposited, by the effect of an electrostatic force, on an article to be painted that is electrically connected to the ground.

FIG. 17 illustrates the spindle device employing the radial air bearing employed in the form of a self-acting air journal bearing of a tilting pad type such as disclosed in, for example, the Japanese Laid-open Patent Publication No. 56-163775. A cross-sectional view of such self-acting air journal bearing taken along the line VIII—VIII in FIG. 17 is shown in FIG. 18.

The spindle device shown in FIG. 17 includes front and rear housings 102 and 103 of a substantially hollow cylindrical configuration, which are connected together by means of bolts 104 in coaxial relation with each other. A rotary shaft 108 is rotatably inserted into the front housing 102 and a paint atomizer head 109 is mounted on a front end of the rotary shaft 108 by means of a nut 110 for rotation together with the rotary shaft 108. The front housing 102 is provided with two tilting pad air bearings 122 and 123 for rotatably supporting the rotary shaft 108. Each of the tilting pad air bearings 122 and 123 includes, as shown in FIG. 18 in a cross-sectional representation, three pads 124, 125 and 126 disposed around a hollow cylindrical body 108a of the rotary shaft 108 while being spaced a slight distance therefrom. Those pads 124 to 126 are supported by means of respective support pins 127, 128 and 129 for rocking motion. The support pin 127 is fixed in position through a support arm having a leaf spring 136a and, therefore, the pad 124 is urged towards the hollow cylindrical body 108a by the action of the leaf spring 136a. In this structure, when the rotary shaft 108 is driven, an ambient air can be drawn into respective gaps defined between the hollow cylindrical body 108a of the rotary shaft 108 and the pads 124 to 126 and, therefore, a pressure is developed by the effect of a so-called self-acting. Since the pads 124 to 126 can undergo rocking motion and since the pad 124 is resiliently supported for movement in a radial direction, any possible fluctuation of the rotary shaft 108 which would result from an unbalance and an aerodynamic instability can advantageously be suppressed to thereby enable the rotary shaft 108 to be stably supported even during a high speed rotation.

For rotatably supporting the rotary shaft 108 in an axial direction, the spindle device shown in FIG. 17 makes use of an externally pressurized air bearing. As shown in FIG. 17, a pair of disk-shaped runners 139 and 140 and a turbine wheel 142 are fixedly mounted on a shank portion 108c of the rotary shaft 108. An annular plate 144 formed with air discharge ports 151 and 152 for discharge of a compressed air is disposed between the runners 139 and 140 and spaced a slight distance therefrom, to thereby complete the externally pressurized air thrust bearing. In this structure, when the compressed air is jetted from a jet nozzle 157 towards the turbine wheel 142, the rotary shaft 108 can be driven by the compressed air so supplied.

Since a high voltage is applied in the case of the electrostatic painting machine, the spindle device is often driven by an air turbine in order to secure an electric insulation of the spindle. However, in the rotary atomized for use in other applications, an electric motor is generally used as a drive unit for driving the rotary shaft.

However, the Japanese Laid-open Patent Publication No. 56-163775 disclosing the spindle device shown in FIG. 17 merely describes that "a foil bearing can be suitably used in association with a rotary shaft that is driven at high speeds and, accordingly, foil bearings can be employed in place of the tilting pad type air bearings 122 and 123", and makes no more mention of the details of the foil bearing.

The foil bearing referred to above is one of self-acting air bearings, in which a bearing surface is defined by a flexible or thin metal plate and the rotary shaft can be supported in a non-contact fashion by the action of a pressure developed between the metal plate and the rotary shaft by the effect of a self-acting brought about by rotation of the rotary shaft. Various types of the foil bearings have hitherto been suggested, some of which are shown in FIGS. 19A to 19C.

The foil bearing shown in FIG. 19A is of a structure in which a rotatable support roller 201 is disposed at three locations for applying a tension to an endless annular foil 203 so that when the rotary shaft 202 is in a stationary, i.e., halted condition, the outer periphery of the rotary shaft 202 is held in contact with the foil 203 at three positions each substantially intermediate between the neighboring support rollers 201. This type of the foil bearing is disclosed in, for example, the Japanese Laid-open Patent Publication No. 54-87343. According to this patent publication, it is described that since the foil revolves together with the rotary shaft before the revolution speeds of the rotary shaft increases to a value sufficient to develop a required pressure, neither friction nor frictional wear occur at the time of start and halt of the rotary shaft and, therefore, the foil bearing can have an increased lifetime.

The foil bearing shown in FIG. 19B includes a plurality of thin plates 303 cooperating to define the bearing surface and is so designed as to develop a pressure at a plurality of locations around the outer periphery of the rotary shaft (not shown) by the effect of a self-acting.

The foil bearing shown in FIG. 19c includes a top foil 405 encircling, in a generally single turn, the rotary shaft 401 through an annular gap A, and a bump foil is interposed between the housing 402 and the top foil 405 to support the latter.

Since the foil bearing is capable of tolerating a thermal deformation and a misalignment owing to its structure, the foil bearing is largely employed in turbo machines such as, for example, a gas turbine and a compressor.

While the rotary atomizer requires a frequent replacement of the atomizer head, a frictional wear of a mount used on the rotary shaft for supporting the atomizer head and/or a deformation of the atomizer head tend to bring about a considerable unbalance. Also, even an uneven deposition of a liquid medium to be treated and subsequent solidification thereof while being deposited also brings about a considerable unbalance. For these reasons, the spindle used in the rotary atomizer have to endure such a considerable unbalance while it rotates at a high speed. In addition, in order to treat a liquid medium of a high viscosity and/or to reduce the particle size of the atomized particles, the spindle has to be driven at a high speed. However, with the conventional spindle devices shown respectively in FIGS. 16 and 17, the spindle is unable to withstand against an exciting force resulting from the unbalance and the spindle will eventually fail to rotate as a result of contact of the rotary shaft with the bearing surface.

In the case of the electrostatic painting machine, it is a recent trend to mount the painting head, including the spindle, on an articulated robot to permit the latter to perform a spraying work. In such case, if the spindle is heavy, the articulated robot of a bulky size would be required, posing a problem associated with the space for installation and the cost. Because of this, it is necessary to reduce the weight of the spindle device. Since the bearing gap in the externally pressurized air bearing is determined by a difference in size of the various component parts, a highly accurate machining is required. For this reason, it is necessary to increase the rigidity of the component parts so that any undesirable deformation thereof during machining can be minimized. Also, it is necessary to provide an air supply passage for supplying a gaseous medium towards the bearing in the housing. By these reasons, it is difficult to reduce the wall thickness of the various component parts in an attempt to reduce the weight of the spindle device.

Other than the failure of the rotary shaft to rotate properly as a result of contact with the bearing surface, failure of the rotary shaft to rotate properly may occur when the liquid medium to be treated ingresses inside the spindle. With the conventional spindle device, once the failure occurs, the rotary shaft failing to rotate properly has to be removed from the spindle device and then to be submitted to the manufacturer for repair, resulting in both increase of the cost for repair and waste of a substantial amount of time. Where the line is desired to be operated while the rotary shaft is submitted to the manufacturer for repair, an extra spindle must be prepared for replacement with the rotary shaft and, therefore, maintenance is costly in this respect.

In the case of the spindle utilizing the tilting pad type bearings shown in FIG. 17, in order to secure a predetermined floating characteristic, the radius of curvature of the bearing surface defined by the bearing pads must be of a value greater by a few to 10 $\mu$m than the outer diameter of the rotary shaft and, in addition, since the bearing pads are of a generally arcuate shape, machining is more difficult to achieve than the externally pressurized bearing. Also, since the thrust bearing employed is in the form of the externally pressurized air bearing, respective positions of the pads of each radial bearing have to be carefully adjusted so that the runners 139 and 140 fixed on the rotary shaft can be disposed at a predetermined position with a slight thrust bearing gap defined in cooperation with the thrust bearing surface (opposite surfaces of the annular plate 144) fixed to the housing. Thus, machining and assembly adjustment are extremely difficult to achieve, making it difficult to achieve a mass-production and, therefore, this type of the spindle device has not yet been employed in the painting line.

As a bearing assembly for use in a machine of a kind requiring a high speed rotation, such a foil bearing as shown in FIG. 13 is also known in the art and is disclosed in, for example, the Japanese Laid-open Patent Publication No. 10-331846. FIG. 13 illustrates the foil bearing used as a journal bearing (a sliding bearing of a radial type), in which a bearing foil 53 disposed around the rotary shaft 54 with a bearing gap defined between it and the rotary shaft 54 is elastically supported by a bearing housing 51 through a multiplicity of bump foils 60 and 62. In this assembly, when the rotary shaft 54 rotates in a direction shown by the arrow 50, air can be drawn into a generally wedge-shaped gap defined between the rotary shaft 54 and the bearing foil 53 to develop a pressure by which a load capacity can be induced. In the event of a load acting on the rotary shaft 54, the bump foils 60 and 62 and the bearing foil 53 undergo deformation in dependence on change of a distribution of pressure within the bearing gap to properly correct the shape of the bearing gap (a gaseous film), thereby resulting in a stable operation. Also, by the action of a frictional force acting between the bump foils 60 and 62 and the bearing housing 51, also acting between the bearing foil 53 and the bump foils 60 and 62, the damping capacity can be deployed.

Although each of the bump foils 60 and 62 is prepared from a thin metal plate by corrugating it so as to have alternating hills and dales that continue axially and is therefore easily deformable in a plane perpendicular to a center axis, each bump foil is hard to deform in a plane parallel to the center axis. As such, deformation of the bearing foil 53 can results in an optimum shape in dependence on the distribution of pressure within the bearing gap so far as the circumferential direction is concerned, but so far as the axial direction is concerned the amount of deformation is substantially constant and the bearing gap cannot necessarily attain an optimum shape. In order to alleviate this drawback, in the example shown in FIG. 13, it is suggested to divide each of the bump foils 60 and 62 in an axial direction. An attempt is also made to superimpose the bump foils 60 and 62 of different shapes one above the other so that the spring characteristic thereof may have a non-linearity to thereby increase the load capacity and also to utilize a friction between the bump foils 60 and 62 to improve the damping characteristic. However, it has been found that these attempts tend to result in complication of the structure of the bump foils 60 and 62, accompanied by difficulty in manufacture and increase of the cost of manufacture.

Even in the foil bearing of the thrust type, the design similar to that shown in and described with reference to FIG. 13 has been suggested and is disclosed in, for example, the Japanese Laid-open Patent Publication No. 10-331847. This foil bearing of the thrust type is capable of supporting an axially acting load in a manner similar to that described with reference to FIG. 13.

The foil bearing of the type utilizing the bump foils as seen in any of the various bearings discussed above can have an increased load capacity if the shape of each of the bump foils is properly tailored so that a distribution of rigidity of support of the bearing foil 53 can be optimized. However, the structure tends to become complicated and compactization is hard to achieve and, yet, it tends to be expensive because a highly accurate press work is needed. Also, no sufficient damping capacity can be obtained in the event that the exciting force brought about by, for example, the unbalance of the rotating body is considerable.

SUMMARY OF THE INVENTION

In view of the foregoing, the present invention is intended to provide a foil bearing of a simplified structure having an increased load capacity and an increased damping characteristic and, therefore, capable of permitting a rotary shaft having a considerable unbalance as compared with that in the conventional devices to be stably driven at a high speed and in which the spring constant of an elastic member supporting a bearing foil can be easily set to a wide range, and also to provide a spindle device utilizing such foil bearing to improve the permissible amount of unbalance and capable of being assembled light-weight.

In order to accomplish the foregoing objects, the present invention in accordance with one aspect thereof provides a foil bearing which includes an elastic member prepared from a wire net formed by braiding wires, and a thin bearing foil supported by the elastic member and defining an elastic bearing surface. The wires are preferably thin metal wires. The bearing foil referred to above is preferably made of, for example, a thin metal plate. Preferably, the elastic member referred to above is shaped to a predetermined shape after having been braided. The foil bearing may be used as a sliding bearing of a radial type, that is, a journal bearing, or a sliding bearing of a thrust type. Braiding of the wires to form the wire net referred to above is intended to means that the wires are entangled to such an extent that they will not be naturally disentangled and, in this respect, the wires may not be always knitted in a manner similar to a textile fabric.

According to this aspect of the present invention, since the foil bearing is made up of the elastic member in the form of a wire net formed by braiding wires such as, for example, thin metal wires and the bearing foil prepared from a thin plate such as, for example, a thin metal plate, a favorable damping characteristic can be obtained as a result of friction among the wires forming the elastic member. Also, the amount of deformation of the bearing foil not only in a circumferential direction thereof, but also in an axial direction thereof varies depending on a bearing load and, also, a distribution of the bearing gap varies flexibly to deploy a large load capacity. For this reason, even though the foil bearing of the present invention is of a simplified structure, it is possible to rotate stably at a high speed the rotary shaft having a considerable unbalance as compared with that in the conventional bearing. The elastic member can have a spring rigidity that can be adjusted as desired by changing the shape, the average density of disposition and/or the wire gauge of the wires used and, therefore, the freedom of choice of the spring rigidity that determines the bearing characteristic such as the load capacity is relatively large. Since the elastic member can be formed with the use of an integral moulding, it can be mass-produced and, therefore, a low cost can be attained. Also, since the structure is simple, the entire foil bearing can be compactized.

In this type of the foil bearing, the elastic member and a portion of the bearing foil may be fixed together, and the elastic member may be assembled into the hollow of a bearing housing while being elastically deformed so that a subassembly of the elastic member and the bearing foil can be fixed inside the bearing housing by means of an elastic force of restitution of the elastic member. Connection of the elastic member with the bearing foil may be carried out by means of, for example, welding or plastic forming. The position at which the elastic member and the bearing foil are fixedly connected together may be at one end of the bearing foil where the bearing foil is of, for example, a band shape.

The elastic member may be formed into a cylindrical shape and is then press-fitted into the hollow of the bearing housing. Alternatively, the elastic member may be formed in a two-dimensional band and the elastic member and the bearing foil may be, after having been overlapped one above the other, curled to represent a cylindrical shape and then disposed within the hollow of the bearing housing.

Thus, since the elastic member and the portion of the bearing foil can, after having been connected together, be fixed inside the bearing housing by the action of the elastic force of restitution, assemblage can easily be accomplished. Also, where an attempt is made to mount the foil bearing inside the bearing housing by the utilization of the elastic force of restitution accumulated in the curled elastic member or by the elastic force of restitution exerted by the press-fitted elastic member, the bearing foil and the elastic member can slide relative to the bearing housing and can subsequently rotate with the rotary shaft, when an excessive torque acts on the bearing foil and the elastic member as a result of contact of the rotary shaft then rotating with the bearing foil by the action of, for example, an excessive load. Accordingly, any possible damage resulting from a seizure between the rotary shaft and the bearing foil can advantageously be minimized.

The elastic member has first and second opposite surfaces that are brought into contact with a bearing housing for supporting the elastic member and the bearing foil, respectively, and at least one of the first and second surfaces of the elastic member may be corrugated to have alternating hills and dales. Corrugation results in such at least one of the opposite surfaces of the elastic member representing a wavy sectional configuration. Where the opposite surfaces of the elastic member are corrugated, it will be understood that the elastic member prepared from the wire net of the wires assumes a wavy configuration.

Shaping of the elastic member by corrugation is effective to allow the rigidity of support of the bearing foil to be set to a further wide range.

The bearing housing may have an inner peripheral surface formed with a key groove, so that the elastic member can, after having been curled to represent a cylindrical shape and then inserted into the hollow of the bearing housing, be firmly connected with the bearing housing by means of a key.

Where the torque is large, rotation of the bearing foil and the elastic member in unison with the rotary shaft can be prevented if the subassembly of the bearing foil and the elastic member is fixed in position by the key within the bearing housing having the key groove defined therein.

The elastic member may be made up of a plurality of divided elastic segments arranged in a predetermined direction, with each divided elastic segment having at least one of a different wire diameter and a different density of disposition of the wires. The divided elastic segments may be arranged in either a direction conforming to the direction of rotation or a direction perpendicular to the direction of rotation. The direction perpendicular to the direction of rotation referred to above is an axial or radial direction along the bearing surface. Where the foil bearing is used as a radial bearing and the elastic member used therein is of a cylindrical configuration, the elastic member may be made up of a plurality of divided elastic segments arranged in the axial direction. On the other hand, where the foil bearing is used as a thrust bearing and the elastic member is of a ring or disc shape, the elastic member may be made up of a plurality of divided elastic segments arranged in the circumferential direction.

Alternatively, the elastic member may have a density of disposition of the wires varying from one location to another. The direction in which the density of disposition of the wires varies may be a predetermined direction. By way of example, it may be a direction conforming to the direction of rotation or a direction perpendicular to the direction of rotation (i.e., the axial or radial direction along the bearing surface). Where the elastic member is of a cylindrical configuration, change in density of disposition of the wires may take place in a direction axially of the center of rotation.

Thus, by adjusting the wire diameter and/or density of disposition of the wires forming the elastic member, the rigidity of support of the bearing foil within the bearing surface can be varied and, therefore, by adjusting a displacement of the bearing foil which occurs when a load acts thereon, an optimum distribution of the bearing gap can be realized depending on a loaded condition.

The present invention in accordance with another aspect thereof provides a spindle device which includes a rotary shaft having a head mount to which an atomizer head is mounted, and radial and thrust bearings for supporting the rotary shaft for rotation relative to a housing. Each of the radial and thrust bearings used therein is a foil bearing of the structure provided according to the previously described aspect of the present invention. Specifically, the foil bearing used therein is of the structure including a bearing foil having a bearing surface confronting the rotary shaft and an elastic member interposed between the housing and the bearing foil to elastically support the bearing foil.

In this foil bearing in which the bearing foil is elastically supported by the elastic member, when the rotary shaft then rotating fluctuates, the bearing foil moves correspondingly to develop a relative movement between the bearing foil and the elastic member and also between the elastic member and the housing. At this time, a frictional force acts as a damping force to the fluctuation of the rotary shaft. Accordingly, as compared with the damping force brought about by the viscosity of an air inside the bearing gap such as observed in the externally pressurized air bearing, an extremely large damping force can be obtained. Since the foil bearing of the type having such a capability is used for both the radial bearing and the thrust bearing for the support of the rotary shaft, the permissible amount of unbalance can be increased. For this reason, even in the case where the atomizer head deforms and/or a liquid medium being treated or a solid component thereof is deposited having been biased, a normal rotation can take place. Also, when each of the radial bearing and thrust bearing is employed in the form of the foil bearing, the corresponding bearing surface thereof can deform and, therefore, slight errors in shape and misalignment can be compensated for and the requirement for accuracy of component parts can be mitigated. Accordingly, not only can the cost of manufacture be reduced advantageously, but the component parts can have a reduced wall thickness to permit the spindle device to be manufactured light-weight and compact in size.

This spindle device may utilize a plurality of radial bearings, in which case the rotary shaft may be provided with a thrust plate, and the thrust bearings may be positioned to cooperate with each of opposite surfaces of the thrust plate in the rotary shaft.

In this spindle device, the wires used in at least one of the foil bearings serving respectively as the radial and thrust bearings may be thin metal wires.

The radial bearing employed in the form of the foil bearing may be of a structure in which bearing foil and elastic member are interconnected with each other to define a subassembly which is, while the elastic member being elastically deformed, inserted into the hollow of the housing and fixed in position within the housing by means of an elastic force of restitution of the elastic member.

Where as described above the elastic member and the bearing foil are fixed in position inside the housing by the effect of the elastic force of restitution, they are fixed by the action of a frictional force and, therefore, in the event that an excessive torque is developed as a result of contact of the rotary shaft, then rotating at a high speed, with the bearing foil, the bearing foil and the elastic member can rotate together with the rotary shaft to thereby minimize any possible damage to the rotary shaft.

The spindle device may employ a plurality of radial bearings and the housing used therein may correspondingly be divided into a bearing housing for supporting the elastic member and bearing foil of each of the radial bearings and a body housing in which the bearing housing is detachably mounted. In other words, each of the radial bearings is assembled into a bearing unit including the foil bearing and the bearing housing.

If each of the radial bearings is formed into the unit and the resultant unit is to be incorporated into a housing body, the foil bearing and the bearing housing can be replaced in the form of the unit in the event of the bearing being damaged and, thus, repair can readily and easily be accomplished. If separate structures are employed, a problem would arise as to the assembling accuracy. However, since the foil bearing is effective in that a misalignment can be compensated for to a certain extent, such division is possible.

When each of the radial bearings is to be assembled into a bearing unit including the foil bearing and the bearing housing, the body housing may further be divided into an outer casing and a separate housing detachably fitted to the outer casing and in which the respective bearing housings of the plural radial bearings are detachably mounted. This can facilitate the repair.

Also, the spindle device may be of a type for use in a rotary atomizer in which case the atomizer head is operable to atomize a liquid medium by an effect of a centrifugal force; the rotary shaft is a hollow shaft; a nozzle for supplying the liquid medium towards the atomizer head for atomization is inserted into the hollow of the rotary shaft; the rotary shaft has an outer periphery formed with a plurality of turbine blades; and a turbine nozzle is provided in the housing for applying a compressed air to the turbine blades.

Considering that the spindle device used in the rotary atomizer involves a problem associated with generation of an exciting force brought about by an unbalance resulting from a frictional wear and/or deformation of the mount on which the atomizer head is mounted and/or deposition of the liquid medium being treated, the permissible amount of unbalance is desired to be increased. Accordingly, any of the foregoing structures according to the present invention is effective to meet with such a problem.

The present invention in accordance with a further aspect thereof also provides a spindle device which includes a rotary shaft having a head mount to which an atomizer head is mounted, and a radial bearing for supporting the rotary shaft for rotation relative to a housing. In this spindle device, the radial bearing is employed in the form of the foil bearing of the kind described in connection with the first aspect of the present invention. More specifically, the foil bearing employed in the spindle device according to this further aspect of the present invention includes a bearing foil having a bearing surface confronting the rotary shaft and an elastic member interposed between the housing and the bearing foil to elastically support the bearing foil of which the wires are thin metal wires.

As hereinbefore discussed, the foil bearing in which the bearing foil is elastically supported by the elastic member is such that when the rotary shaft then rotating fluctuates, the bearing foil undergoes a motion in correspondence therewith so that a relative movement can take place between the bearing foil and the elastic member and also between the elastic member and the housing. At this time, the frictional force developed acts as a damping force against the fluctuation of the rotary shaft. Accordingly, as compared with the damping force brought about by the viscosity of the air inside the bearing gap such as observed in the externally pressurized air bearing, an extremely large damping force can be obtained. Since the foil bearing having such a capability is employed as a radial bearing for the support of the rotary shaft, the permissible amount of unbalance can advantageously be increased. For this reason, even if the atomizer head is deformed and/or the liquid medium being treated is deposited having been biased, a normal rotation can take place. Also, when the radial bearing is employed in the form of the foil bearing, the bearing surface can deform and, therefore, slight errors in shape and misalignment can be compensated for and the requirement for accuracy of component parts can be mitigated. Accordingly, not only can the cost of manufacture be reduced advantageously, but the component parts can have a reduced wall thickness to permit the spindle device to be manufactured light-weight and compact in size.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
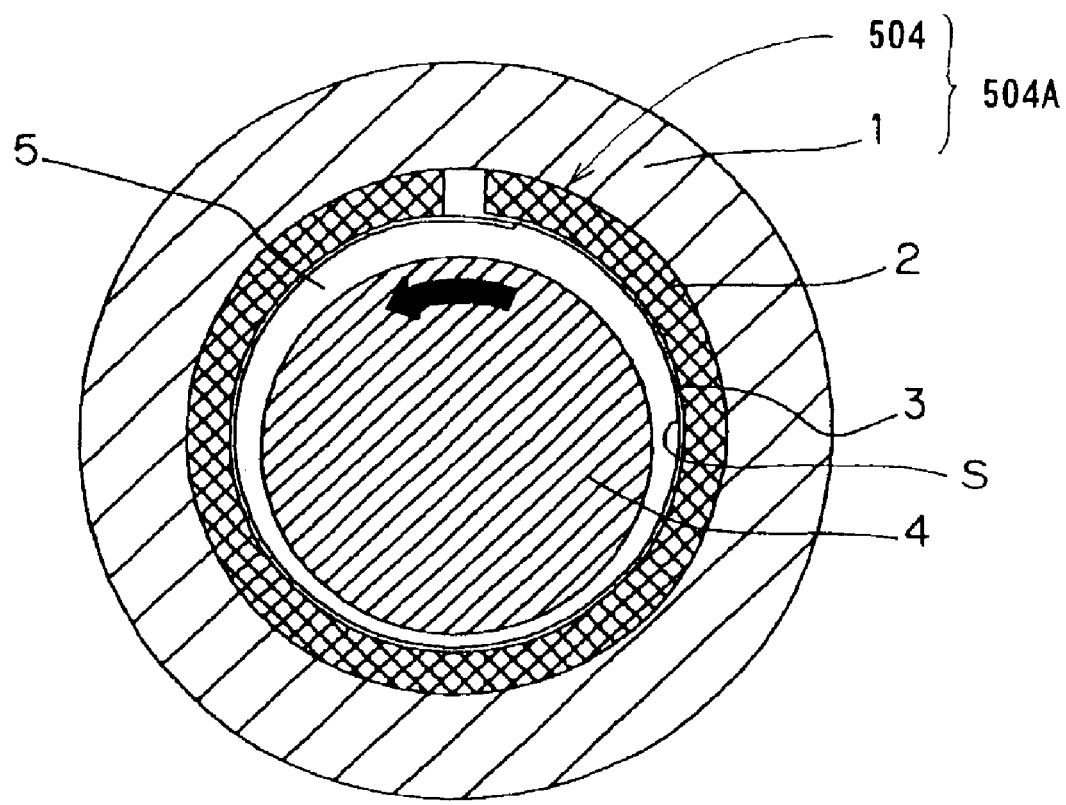
FIG. 1 is a transverse sectional view of a foil bearing of a radial type according to a first preferred embodiment of the present invention.
Figure 2A:
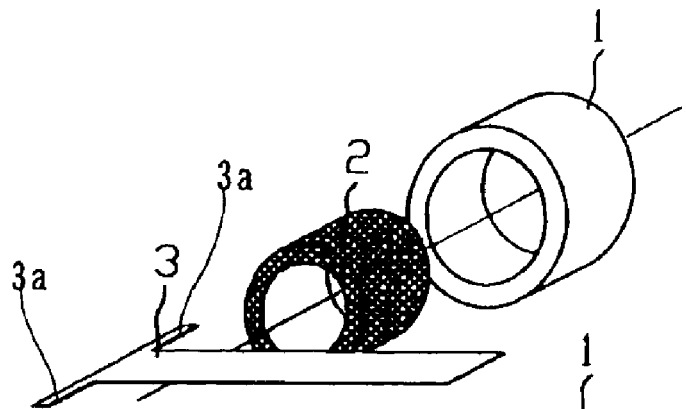
FIGS. 2A to 2D are perspective views showing different first to fourth steps of assemblage of the foil bearing shown in FIG. 1, respectively.
Figure 2B:
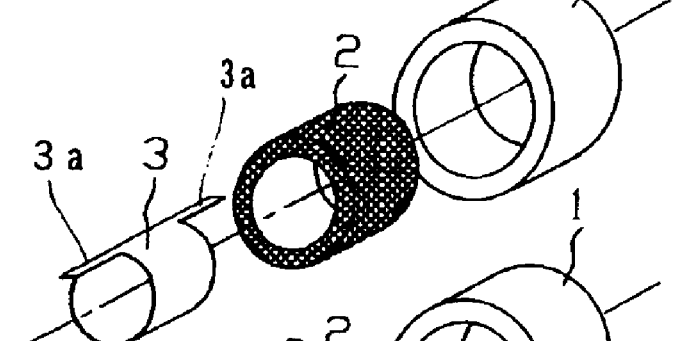
Figure 2C:
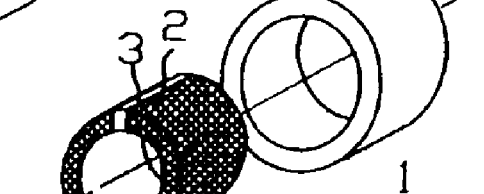
Figure 2D:
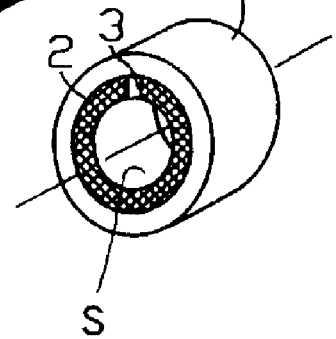

With reference to FIGS. 1 and 2D, a foil bearing according to a first preferred embodiment of the present invention will be described. It is to be noted that the first embodiment shown therein will be described as applied to a sliding bearing of a radial type, that is, a journal bearing. The illustrated foil bearing includes an elastic member 2 formed by pressing a generally wire net, and a bearing foil 3 in the form of a metal foil. The elastic member 2 is shaped to assume a cylindrical configuration by a press work used in pressing the metal net. The metal net referred to above is prepared from thin metal wires. The wire net may be of a structure wherein wires are so braided in either a two-dimensional band or a three-dimensional shape that they will not be naturally disentangled. Specifically, the wires forming the wire net may be so braided or so knitted in a manner similar to a textile fabric, or so merely entangled that they will not come loose.

As shown in FIGS. 2A to 2C, the bearing foil 3 is curled to represent a cylindrical shape and is then inserted into a bore of the elastic member 2 which has already been shaped into a hollow cylinder. This bearing foil 3 is rigidly connected with the cylindrical elastic member 2 by means of connecting pieces 3a which are, after the cylindrical bearing foil 3 has been inserted into the bore of the elastic member 2, folded backwards to rest on an outer periphery of the cylindrical elastic member 2. So far shown, the connecting pieces 3a are formed integrally with one end of the bearing foil 3 so as to extend at right angles to the longitudinal axis of the bearing foil 3 as best shown in FIG. 2A, but they may be any suitable plastically deformable member. Thereafter, as shown in FIG. 2D, the resultant bearing subassembly including the bearing foil 3 positioned inside the elastic member 2 is inserted into and nested within a bore of a bearing housing 1 to thereby complete a bearing assembly, that is, a journal bearing.

In this journal bearing so assembled, an inner peripheral surface of the cylindrical bearing foil 3 inside the cylindrical elastic member 2 defines an elastic bearing surface S. The cylindrical elastic member 2 may have an outer diameter slightly greater than the inner diameter of the bearing housing 1 and, in such case, the cylindrical elastic member 2 may be press-fitted into the bore of the bearing housing 1 to thereby interlock the bearing subassembly, including the elastic member 2 and the bearing foil 3, with the bearing housing 1. The cylindrical elastic member 2 may have an inner diameter which may be, after the bearing subassembly has been set in position inside the bearing housing 1, expanded to a desired dimension. In such case, although the elastic member 2 has an elasticity, plastic deformation occurs in the elastic member 2 when the inner diameter of the elastic member 2 is expanded beyond the limit of elasticity.

After fabrication of the bearing assembly in the manner discussed above, a rotary shaft 4 is inserted into the bearing assembly and, more specifically, inside the bearing subassembly and is ready to rotate. The rotary shaft 4 has a diameter (or an outer diameter) chosen to be smaller by a predetermined quantity than the bore size of the cylindrical bearing foil 3 during assemblage so that in an assembled condition of the bearing assembly, a bearing gap 5 can be formed between the rotary shaft 4 and the cylindrical bearing foil 3.

In operation, as the rotary shaft 4 rotates relative to the bearing assembly, air is drawn into a generally wedge-shaped gap between the rotary shaft 4 and the bearing foil 3, accompanied by generation of a pressure to thereby induce a load capacity. In the event that a load acts on the rotary shaft 4, the cylindrical elastic member 2 and the correspondingly cylindrical bearing foil 3 undergo deformation enough to properly modify the shape of the bearing gap 5 (a gaseous film), resulting in stable operation. Since the cylindrical elastic member 2 has a capability of deforming not only in a circumferential direction thereof, but also in an axial direction thereof, the bearing gap can be properly modified not only in a circumferential direction, but also in an axial direction and, therefore, a relatively large load capacity can be obtained with a simplified structure.

In the event that the rotary shaft 4 undergoes fluctuation during rotation thereof, a frictional force is generated not only between the bearing foil 3 and the elastic member 2 and between the elastic member 2 and the bearing housing 1, but also among the thin metal wires forming the elastic member 2. Because of this, a relatively large damping capacity is induced enough to stably support the rotary shaft 4. It is to be noted that the elastic member 2 has a rigidity that can be adjusted to an optimum value by changing the wire diameter of the thin metal wires forming the elastic member 2 and/or adjusting the compressibility during the shaping of the elastic member 2, that is, adjustment of the apparent density of the elastic member 2 after the shaping.

Where the subassembly including the bearing foil 3 and the elastic member 2 rigidly connected with the bearing foil 3 is press-fitted into and is therefore set in position inside the bearing housing 1, the elastic member 2 and the bearing housing 1 is firmly connected together by the action of a frictional force and, therefore, the both can rotate relative to each other when a torque of a magnitude greater than the frictional force acts. Accordingly, in the event that the rotary shaft 4 is brought into contact with the bearing foil 3 as a result of an excessive load or any other reason and the torque of a magnitude greater than a predetermined value acts on the elastic member 2 from the rotary shaft through the bearing foil 3, the elastic member 2 will rotate together with the rotary shaft 4. Once this occur, the possibility of the bearing surface being damaged can be alleviated advantageously, which would otherwise occur when the rotary shaft 4 and the bearing foil 3 undergo rotation relative to each other.

It is to be noted that this radial bearing 504 and the bearing housing 1 altogether define a bearing unit 504A.

A second preferred embodiment of the present invention will now be described with reference to FIGS. 3 to 4B. In this embodiment shown in FIGS. 3 to 4B, the elastic member 2 is in the form of a generally oblong, two-dimensional metal net prepared from thin metal wires which has been pressed to represent a rectangular sheet. This rectangular sheet, that is, the elastic member 2 and the bearing foil 3 in the form of a rectangular thin metal plate altogether define the foil bearing subassembly. Specifically, the rectangular elastic member 2 is rigidly connected at one end with a corresponding end of the rectangular bearing foil 3. Rigid connection between the rectangular elastic member 2 and the rectangular bearing foil 3 may be carried out in one of the following methods as shown in FIGS. 4A and 4B, respectively.

Figure 4A:
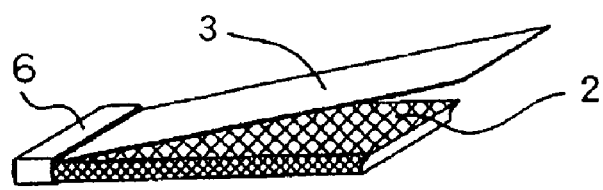
FIGS. 4A and 4B are perspective views of the foil bearing shown in FIG. 3, showing different manners of connecting an elastic member and a bearing foil together, respectively.

In the example shown in FIG. 4A, the rectangular elastic member 2 and the bearing foil 3 are overlapped one above the other so as to extend in the same direction and a fixture 6 is utilized to connect respective ends of the elastic member 2 and bearing foil 3 together, to thereby provide the bearing subassembly. Specifically, the fixture 6 is plastically deformed to crimp the respective ends of the elastic member 2 and bearing foil 3 together. On the other hand, in the example shown in FIG. 4B, the rectangular elastic member 2 has one end overlapped with a corresponding end of the rectangular bearing foil to render the rectangular elastic member 2 and the bearing foil 3 to extend in respective directions away from each other, followed by connection by the utilization of the fixture 6 that is plastically deformed to crimp the overlapping ends of the elastic member 2 and bearing foil 3 together, to thereby provide the bearing subassembly.

The bearing subassembly so formed is curled or wound to fit into the bore of the bearing housing 1 (See FIG. 3) with the cylindrical bearing foil 3 positioned inside the cylindrical elastic member 2, thereby completing the bearing assembly. It will readily be seen that after the bearing subassembly has been inserted into the bearing housing 3, the bearing foil 3 is positioned adjacent the periphery of the rotary shaft 4. Regardless of whether the bearing subassembly is curled with the bearing foil 3 positioned generally radially inwardly of the elastic member 2 as shown in FIG. 4A or whether the bearing subassembly is wound with the bearing foil 3 positioned generally radially inwardly of the elastic member 2 as shown in FIG. 4B, the elastic member 2 so curled or so wound will accumulate an elastic force of restitution and, therefore, when the bearing subassembly is fitted into the bearing housing 3, the elastic force of restitution is relieved to allow the elastic member 2 and, hence, the bearing subassembly to be radially outwardly urged to contact the inner peripheral surface of the bearing housing 3.

When the rotary shaft 4 rotates in a direction shown by the arrow in FIG. 3, the foil bearing of the structure shown in and described with reference to FIGS. 3 to 4B operates in a manner similar to that according to the previously described embodiment.

Even in this second embodiment, this radial bearing 504 and the bearing housing 1 altogether define a bearing unit 504A.

Figure 5:
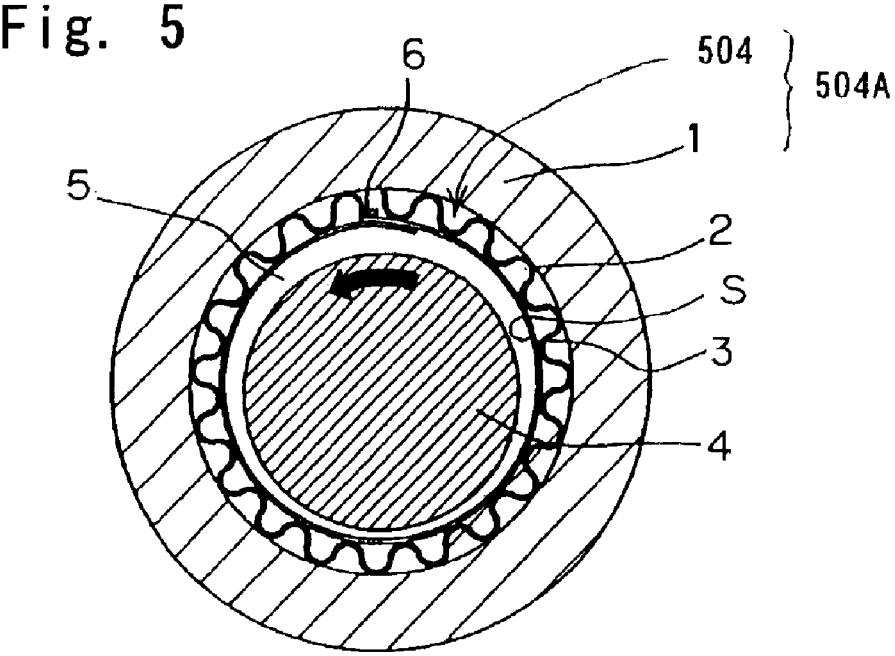
FIG. 5 is a transverse sectional view of the foil bearing according to a third preferred embodiment of the present invention.

Referring to FIG. 5, a third preferred embodiment of the present invention will be described with the present invention applied to the journal bearing. In this embodiment shown in FIG. 5, the elastic member 2 is corrugated to have hills and dales that alternate one after another in a direction circumferentially thereof. In the assembled condition, the hills and dales of the elastic member 2 are held in contact with the inner peripheral surface of the bearing housing 1 and the bearing foil 3, and vice versa. As a matter of course, the elastic member 2 prior to being connected together with the bearing foil 3 is prepared from the wire net as hereinbefore described and is corrugated in any known manner. The use of the corrugated elastic member 2 is effective to allow the rigidity of support of the bearing foil 3 to be set to a wide range. It is to be noted that although in FIG. 5 the elastic member 2 has been shown having its opposite surfaces corrugated, only one of the opposite surfaces of the elastic member that is brought into contact with the bearing foil 3 or with the inner peripheral surface of the bearing housing 1 may be corrugated.

Even in this embodiment of FIG. 5, this radial bearing 504 and the bearing housing 1 altogether define a bearing unit 504A.

Figure 6:
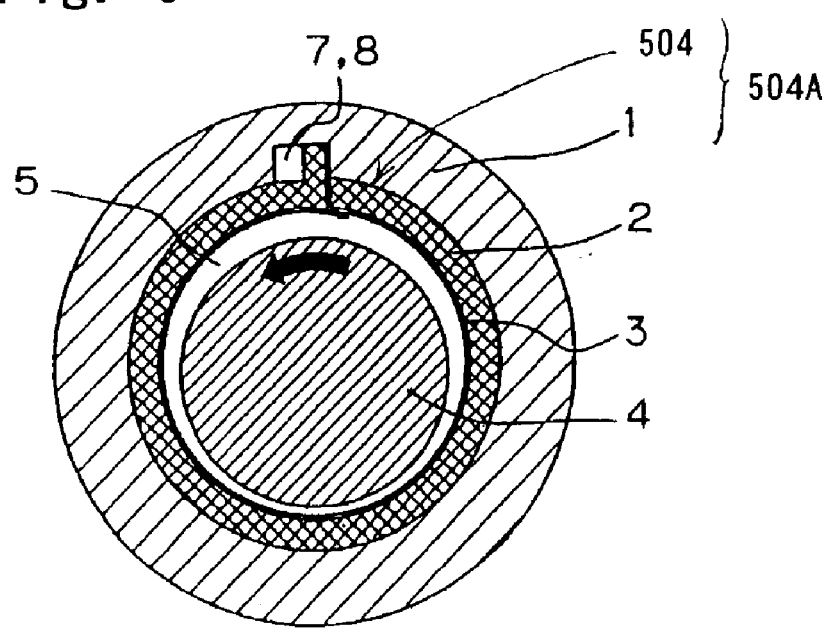
FIG. 6 is a transverse sectional view of the foil bearing according to a fourth preferred embodiment of the present invention.

A fourth preferred embodiment of the present invention is shown in FIG. 6. The embodiment shown therein is similar to the first described embodiment, except that the bearing housing 3 shown in FIG. 6 has the inner peripheral surface formed with an axially extending key groove 7 defined therein and the bearing foil 3 and the elastic member 2 are fixed in position by means of a key 8 engaged in the key groove 7. Even this embodiment is directed to the journal bearing.

The use of the key 8 is effective to avoid rotation of the bearing foil 3 together with the rotary shaft 4 which would otherwise occur when a relatively large frictional force acts between the rotary shaft 4 and the bearing foil 3 at the time of start of rotation of the rotary shaft 4.

Even in this embodiment of FIG. 6, this radial bearing 504 and the bearing housing 1 altogether define a bearing unit 504A.

Figure 7:
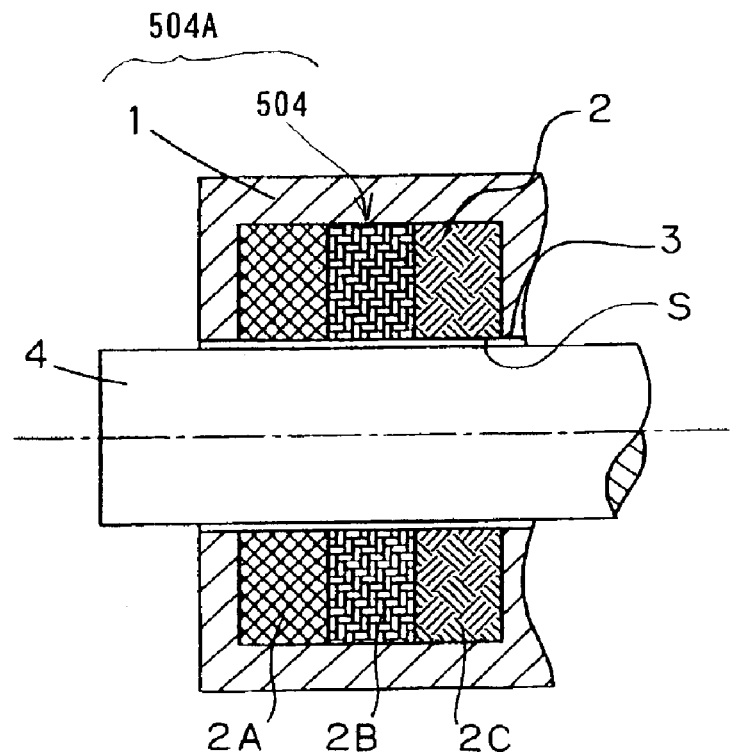
FIG. 7 is a longitudinal sectional view of the foil bearing according to a fifth preferred embodiment of the present invention.

FIG. 7 illustrates a fifth preferred embodiment of the present invention. This embodiment of FIG. 7 is similar to the first described embodiment, except that the elastic member 2 used in the embodiment of FIG. 7 is divided into a plurality of axially disposed elastic segments 2A, 2B and 2C. These elastic segments 2A to 2C have different wire diameters or different densities of disposition of the thin metal wires forming the wire net, respectively.

Figure 8:
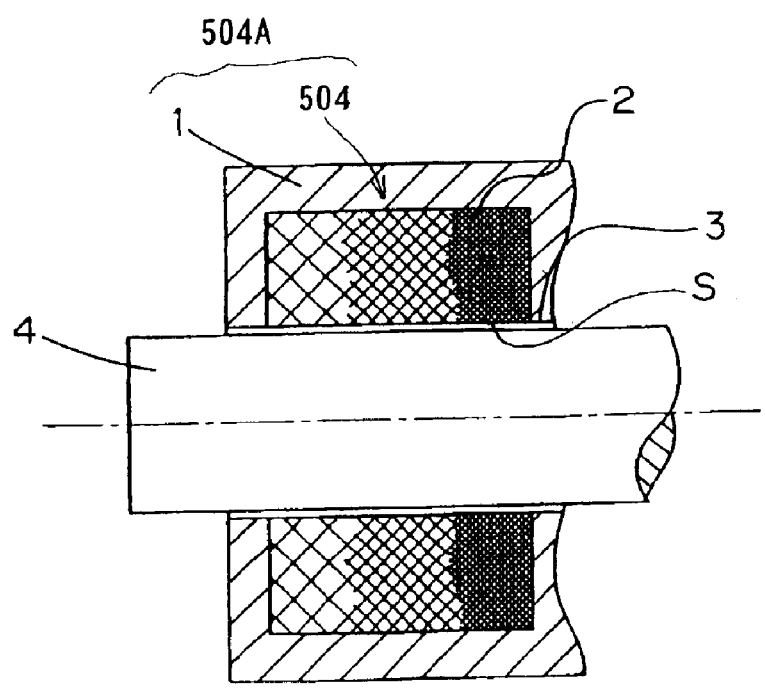
FIG. 8 is a longitudinal sectional view of the foil bearing according to a sixth preferred embodiment of the present invention.

FIG. 8 illustrates a sixth preferred embodiment of the present invention. This embodiment of FIG. 8 is similar to the first described embodiment, except that the elastic member 2 employed therein is of a structure in which the density of disposition of the metal wires is varied in a direction axially. Change in density of disposition of the metal wires may occur either sequentially in the axial direction. Alternatively, different densities of disposition of the metal wires may be employed for axially divided different sections of the elastic member 2. It is to be noted that in FIG. 8 different hatchings denote a difference in density of disposition of the metal wires.

Thus, it will readily be seen that selection of the wire diameter and the density of disposition of the metal wires forming the elastic member 2 such as in any one of the embodiments shown in FIGS. 7 and 8, respectively, is effective to change the rigidity of support of the bearing foil 3 within the bearing housing. Accordingly, it is possible to adjust a displacement of the bearing foil 3 that occurs when a load acts, and to realize an optimum distribution of the bearing gap in dependence on a loaded condition.

Even in these embodiments of FIGS. 7 and 8, this radial bearing 504 and the bearing housing 1 altogether define a bearing unit 504A.

Figure 9:
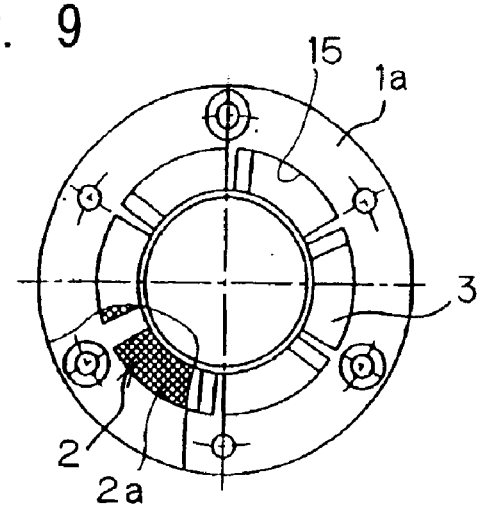
FIG. 9 is an elevational view, with a portion shown in section, of the foil bearing according to a seventh preferred embodiment of the present invention.
Figure 10:
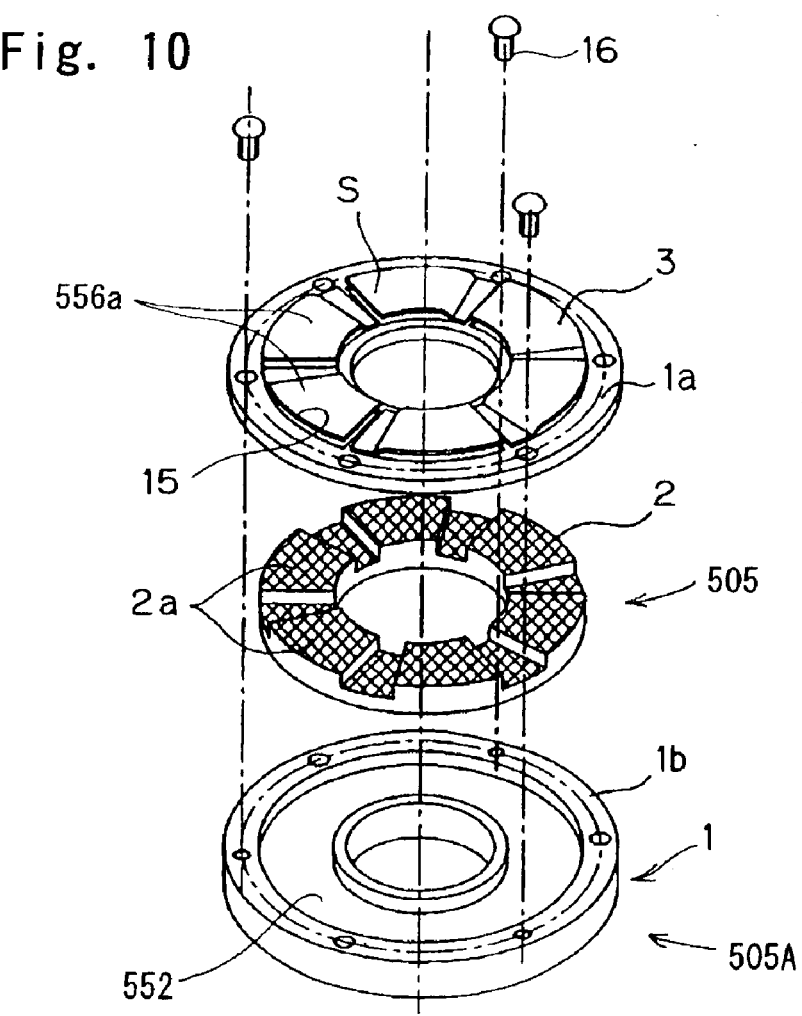
FIG. 10 is an exploded view of the foil bearing shown in FIG. 9.
Figure 11:
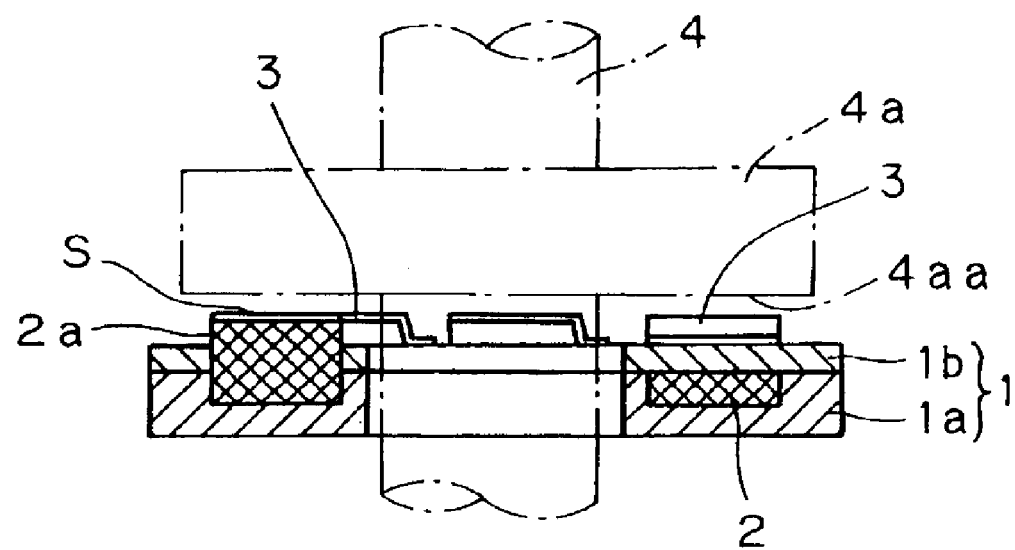
FIG. 11 is a transverse sectional view of the foil bearing shown in FIG. 9.

FIGS. 9 through 11 illustrate a seventh preferred embodiment which is an application of the present invention to a thrust bearing. As shown therein, an annular elastic member 2 has one of axially confronting opposite surfaces thereof formed with a plurality of generally arcuate projections 2a that are separated in a direction circumferentially thereof. This elastic member 2 is nested within a correspondingly annular groove 552 defined in a housing bottom member 1b and is fixedly sandwiched between the housing bottom member 1b and a housing front member (foil base) 1a. The housing front member 1a is formed with generally arcuate openings 15 into which the arcuate projections 2a of the elastic member 2 can be snugly received when the elastic member is sandwiched between the housing bottom member 1b and the housing front member 1a. The housing front member 1a and the housing bottom member 1b are, after having sandwiched the elastic member 2 therebetween, connected together by means of a plurality of fastening members 16 such as, for example, set screws to thereby complete a bearing housing 1. An annular bearing foil 3 is fixedly connected to the housing front member 1a in alignment with a circular row of the arcuate openings 15 of the housing front member 1a by means of any suitable method such as, for example, welding, soldering, bonding or caulking, so as to confront a bearing surface 4aa of an annular thrust plate 4a mounted on a rotary shaft 4 for rotation together therewith as best shown in FIG. 11.

The annular bearing foil 3 is made up of a plurality of generally arcuate and separate bearing foil segments 556a arranged in a circle coaxial with the circular row of the arcuate openings 15 and are elastically supported by the corresponding projections 2a of the elastic member 2 that protrude outwardly from the associated arcuate openings 15 in the bearing plate 1a, as best shown in FIG. 11, to thereby define an elastic bearing surface S. The elastic member 2 and the bearing foil 3 employed in the embodiment shown in FIGS. 9 to 11 are similar in structure to those employed and described in connection with the first described embodiment, except for different outer shapes employed in the embodiment of FIGS. 9 to 11. Accordingly, the elastic member 2 is prepared from a wire net of wires such as thin metal wires. The elastic member 2 employed in this embodiment is shaped to have the arcuate projections 2a by the use of, for example, a press work.

When the housing bottom member 1b, the elastic member 2 and the housing front member 1a having the bearing foil 3 fixed thereto are assembled together with the elastic member 2 intervening between the housing bottom member 1b and the housing front member 1a and the housing front member 1b is subsequently fastened to the housing bottom member 1b by means of the set screws 16, a bearing unit 505A of the thrust bearing 505 can be obtained. In this construction, when the thrust plate 4a rotates together with the rotary shaft 4, the bearing unit 505A can support an axially acting load in a manner similar to that described previously in connection with the journal bearing.

Figure 12:
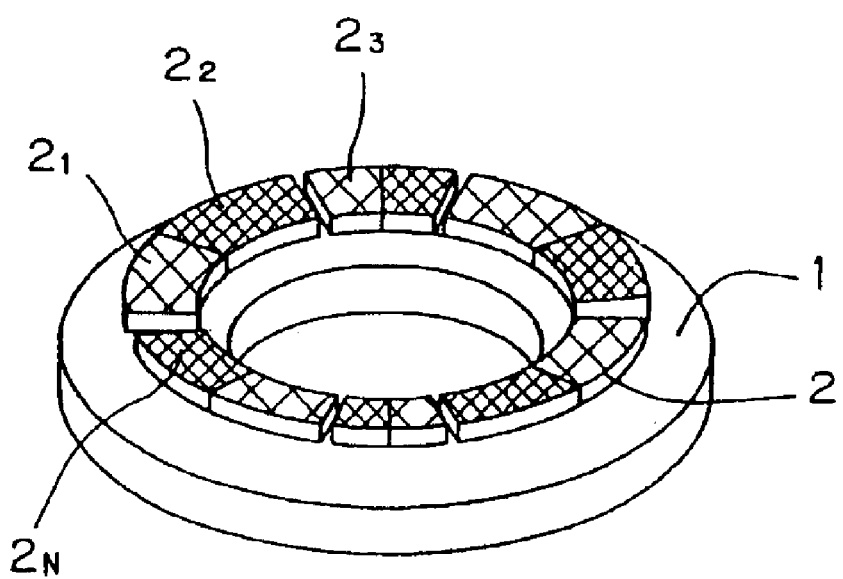
FIG. 12 is a perspective view of the foil bearing according to an eighth preferred embodiment of the present invention, shown with a bearing foil removed.
Figure 13:
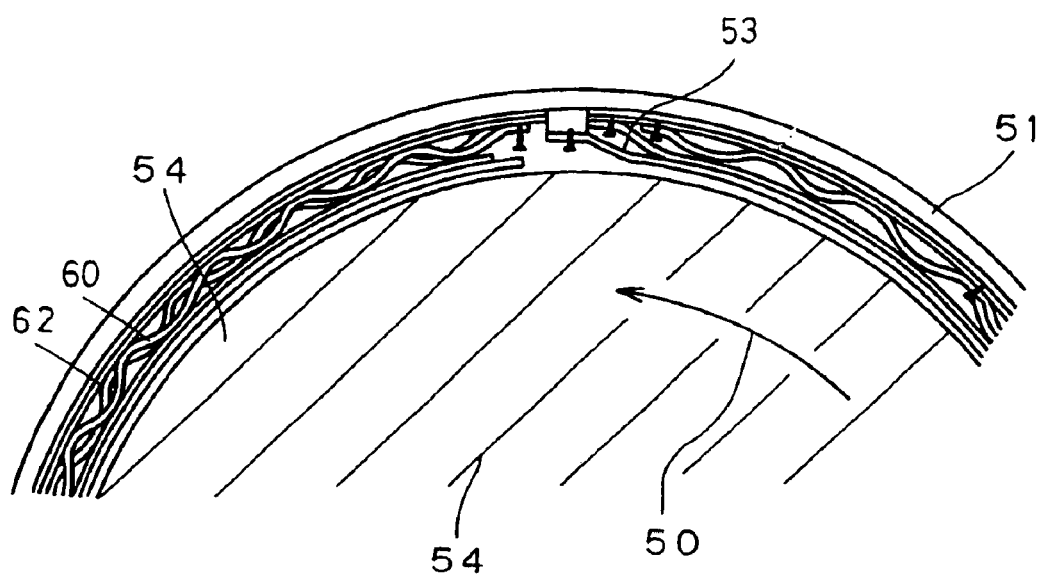
FIG. 13 is a fragmentary transverse sectional view, showing a first prior art foil bearing.

An eighth preferred embodiment of the present invention will now be described with reference to FIG. 12. This embodiment of FIG. 12 is similar to the foil bearing of the thrust type shown in FIG. 11, except that the elastic member 2 shown in FIG. 12 is divided into a plurality of circumferentially disposed elastic segments $2_1$ to $2_N$ which have different wire diameters or different densities of disposition of the wires forming the wire net, respectively. Other structural features of the foil bearing of FIG. 12 are similar to those shown and described in connection with the foil bearing with reference to FIGS. 9 to 11.

It is to be noted that in place of the division of the elastic member into the plural elastic segments $2_1$ to $2_N$, the elastic member 2 have a different density of disposition of the wires for a different portion of the elastic member 2 in the circumferential direction thereof.

In the practice of any one of the foregoing embodiments, the rotary shaft 4, the bearing foil 3 and the elastic member 2 are preferably made of a heat resisting steel or stainless steel. Depending on the application, however, the bearing foil 3 and the elastic member 2 may be made of phosphor bronze or a material generally used to manufacture springs. Also, since at the time of start and stop the rotary shaft 4 and bearing foil 3 slide relative to each other while being held in contact with each other, the use is preferred of an abrasion-resistant or lubricant film on the respective surfaces of the rotary shaft 4 and the bearing foil 3 to minimize or substantially eliminate a frictional wear. For the abrasion-resistant film, a nickel plating, a chrome plating, a vapor deposited film of titanium nitride or amorphous carbon can be employed. Also, for the lubricant film, a plating in which solid lubricant particles such as molybdenum disulfide, graphite, fluorocarbon resin are dispersed, or a resin coating can be employed.

Figure 14:
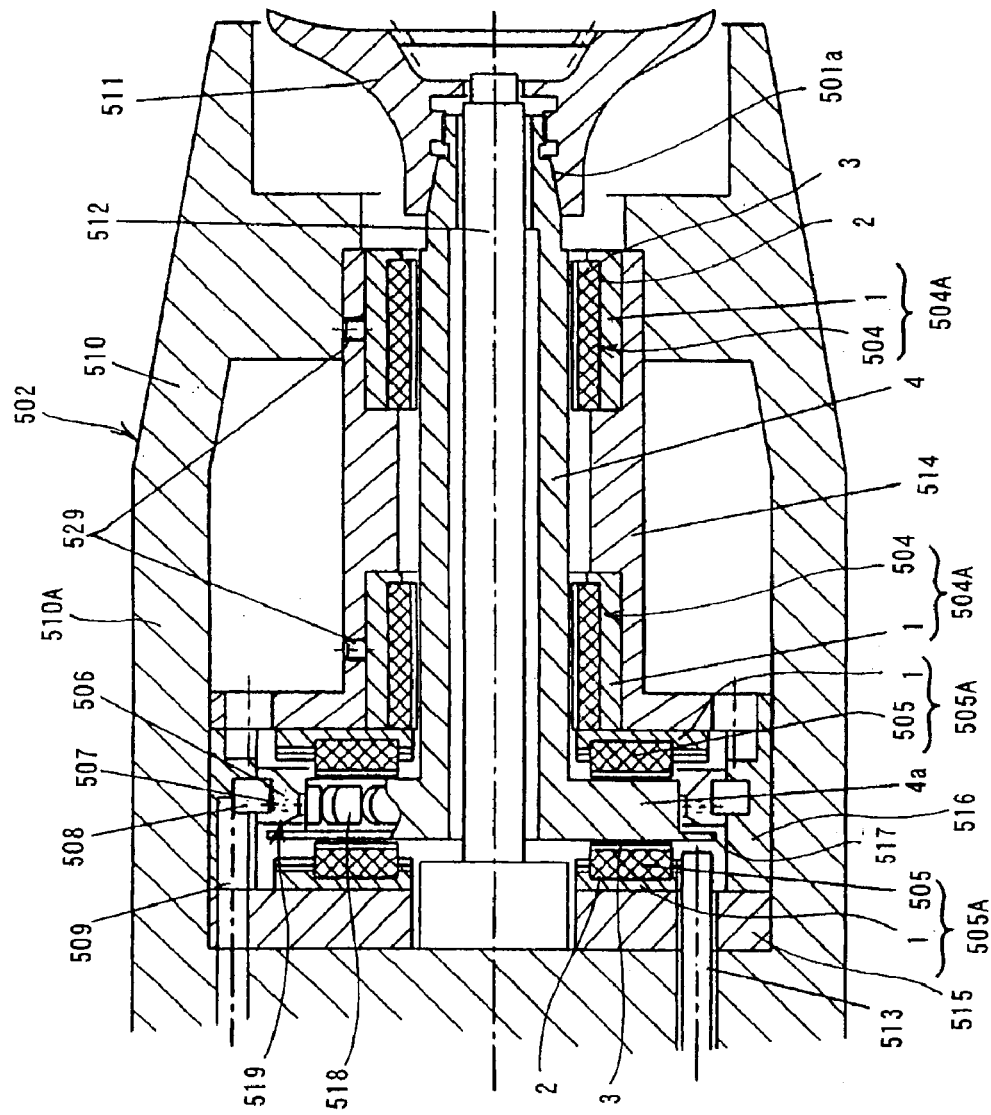
FIG. 14 is a longitudinal sectional view of a spindle device according to one preferred embodiment of the present invention.

Hereinafter, a preferred embodiment of a spindle device according to the present invention will be described with reference to FIG. 14. The spindle device of the present invention is applied to a rotary atomizer for use in electrostatic painting. Referring now to FIG. 14, the spindle device shown therein is of a structure in which the rotary shaft 4 is supported by two radial bearings 504 and two thrust bearings 505 for rotation relative to the housing 502. Each of the radial bearings 504 and thrust bearings 505 is employed in the form of the foil bearing discussed hereinbefore. The illustrated spindle device includes a drive mechanism 519 for driving the rotary shaft 4. The rotary shaft 4 employed therein is in the form of a hollow shaft (although shown as a solid shaft in any one of FIGS. 1, 3, 5 and 6) having a hollow in which a paint spray nozzle 512 is disposed. A free end of the rotary shaft 4 remote from the drive mechanism 519 is formed with an atomizer head mount 501a to which an atomizer head 511 is detachably connected. The opposite end of the rotary shaft 4 adjacent the drive mechanism 519 is formed with a disk-shaped thrust plate 4a so as to protrude radially outwardly therefrom. This thrust plate 4a has an outer peripheral face formed with a plurality of circumferentially equally spaced recesses to define a turbine blade 518 between the neighboring recesses. The turbine blades 518 and turbine nozzles 507 provided in a body housing 510 cooperate with each other to define the drive mechanism 519 referred to hereinabove.

The rotary shaft 4 is rotatably supported by the axially spaced two radial bearings 504 and also by the two thrust bearings 505 positioned on respective sides of the thrust plate 4a. The housing 502 is divided into and is hence comprised of the bearing housings 1, accommodating therein the radial bearings 504 and the thrust bearings 505, respectively, and the body housing 510 in which the bearing housing 1 is detachably accommodated. The body housing 510 is further divided into and is hence comprised of an outer casing 510A and front and rear separate housings 514 and 515 detachably encased within the outer casing 510A. The two radial bearings 504 and one of the thrust bearings 505 are fixed in position inside the front separate housing 514, while the other of the thrust bearings 505 is fixed in position inside the rear separate housing 515. The front separate housing 514 and the rear separate housing 515 are connected together by means of a plurality of bolts (not shown) with a spacer 516 intervening therebetween.

A nozzle sleeve 506 is fixed to an inner periphery of the spacer 516. The nozzle sleeve 506 has its inner periphery confronting the outer peripheral face of the thrust plate 4a, while the turbine nozzles 507 are so disposed as to be oriented in a direction substantially tangential thereto. The turbine nozzles 507 is communicated with a source of compressed air (not shown) through series-connected annular air supply passages 508 and 509 defined in the outer periphery of the nozzle sleeve 506 and the inner periphery of the spacer 516, respectively. Accordingly, when a compressed air is supplied from the compressed air source, the compressed air can be blown off from the turbine nozzles 507 in the substantially tangential direction and subsequently impinge upon the turbine blades 518, defined in the outer periphery of the thrust plate 4a, to thereby drive the rotary shaft 4. Thereafter, the compressed air used to drive the rotary shaft 4 flows towards the outside through an exhaust passage (not shown) defined in the outer casing 510A.

The outer periphery of the thrust plate 4a is provided with a rotation marking flange 517. A rotation sensor 513 is disposed to confront the rotation marking flange 517 and, accordingly, the revolution speed of the rotary shaft 4 can be detected by the rotation sensor 513 that detects passage of a rotation marking provided in the rotation marking flange 517 in front of the rotation sensor 513. The rotation marking can be formed by any suitable method such as, for example, coloring, magnetization or surface indentations. The rotation sensor 513 may be any sensing instrument chosen depending on the kind of the rotation marking and may be an photoelectric switch, a magnetic sensor, an electromagnetic pick-up or a displacement sensor. Since the rotary shaft 4 rotates at high speed, the use of a non-contact sensor is preferred for the rotation sensor 513.

Figure 3:
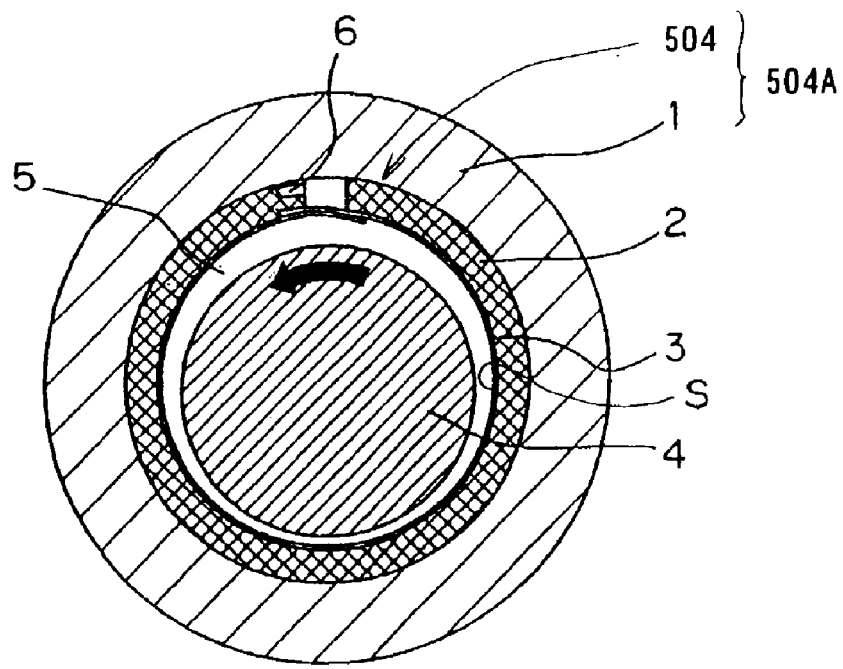
FIG. 3 is a transverse sectional view the foil bearing according to a second preferred embodiment of the present invention.
Figure 4B:
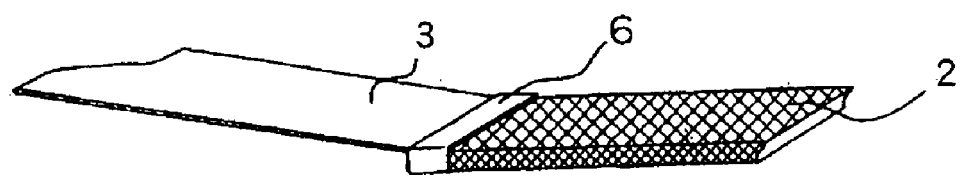

Each of the radial bearings 504 employed in the spindle device may employ the foil bearing of the structure according to the embodiment shown in FIG. 3 or FIG. 1.

Each radial bearing 504 is inserted, in the form of the bearing unit 504A, into a bearing pocket defined in the inner peripheral surface of the front separate housing 514 and is then detachably fixed in position by means of one or more set screws 529.

Figure 15:
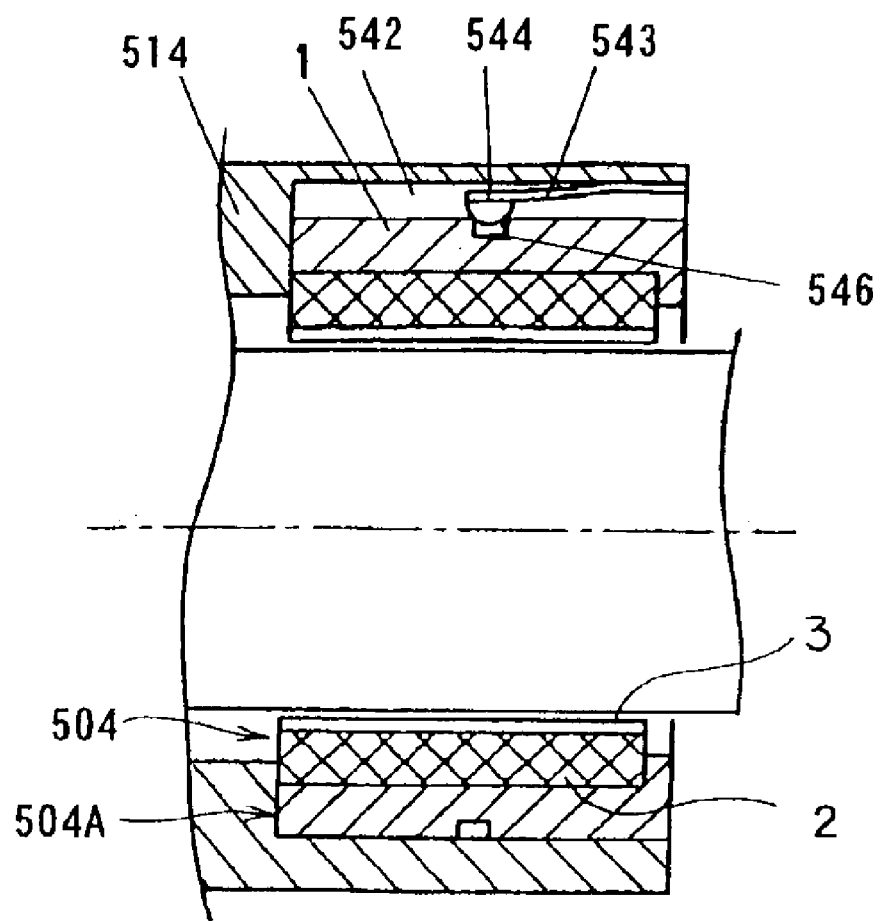
FIG. 15 is a fragmentary longitudinal sectional view of the spindle device, showing a different manner of mounting of a radial bearing employed in the spindle device.
Figure 16:
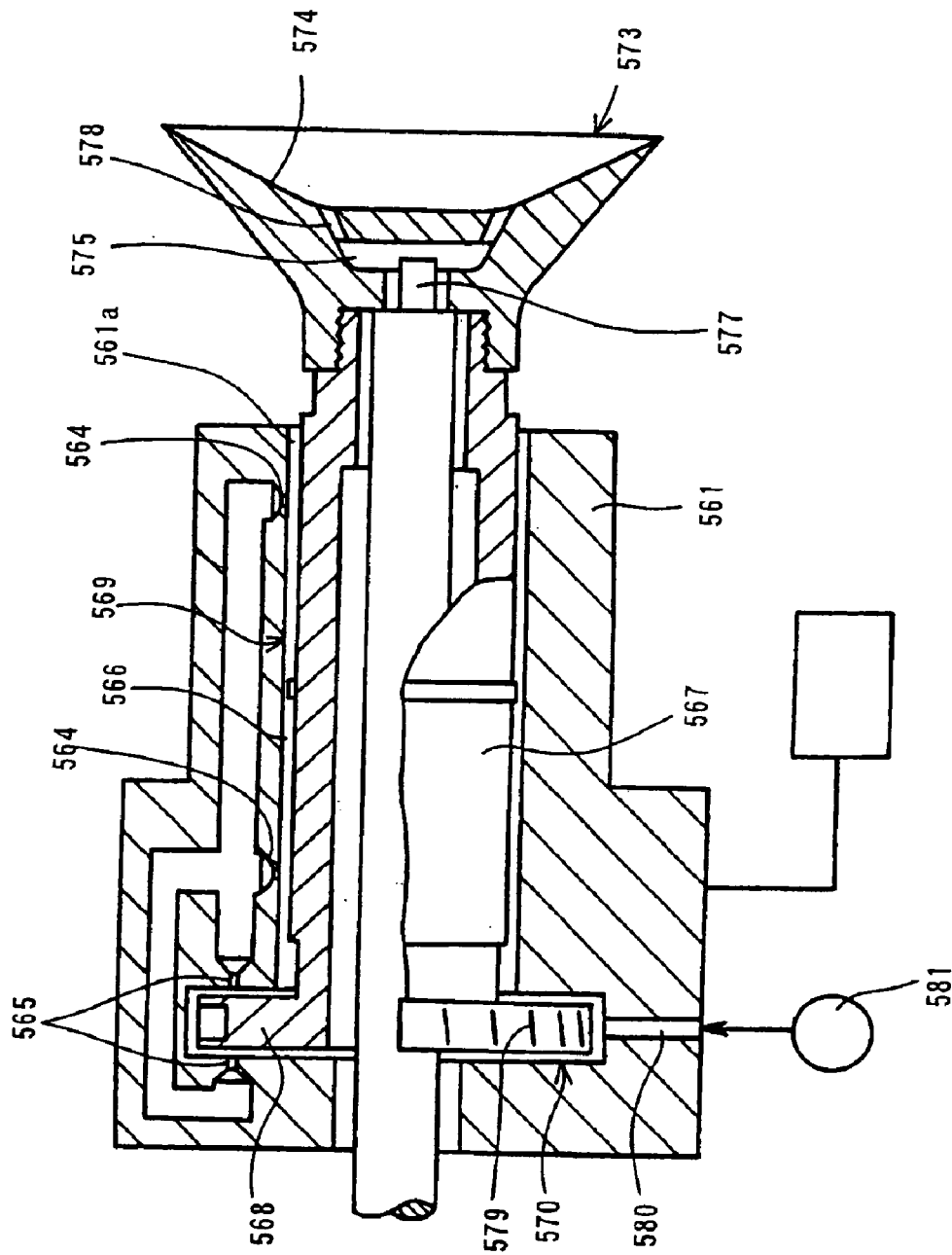
FIG. 16 is a longitudinal sectional view of a first prior art spindle device.
Figure 17:
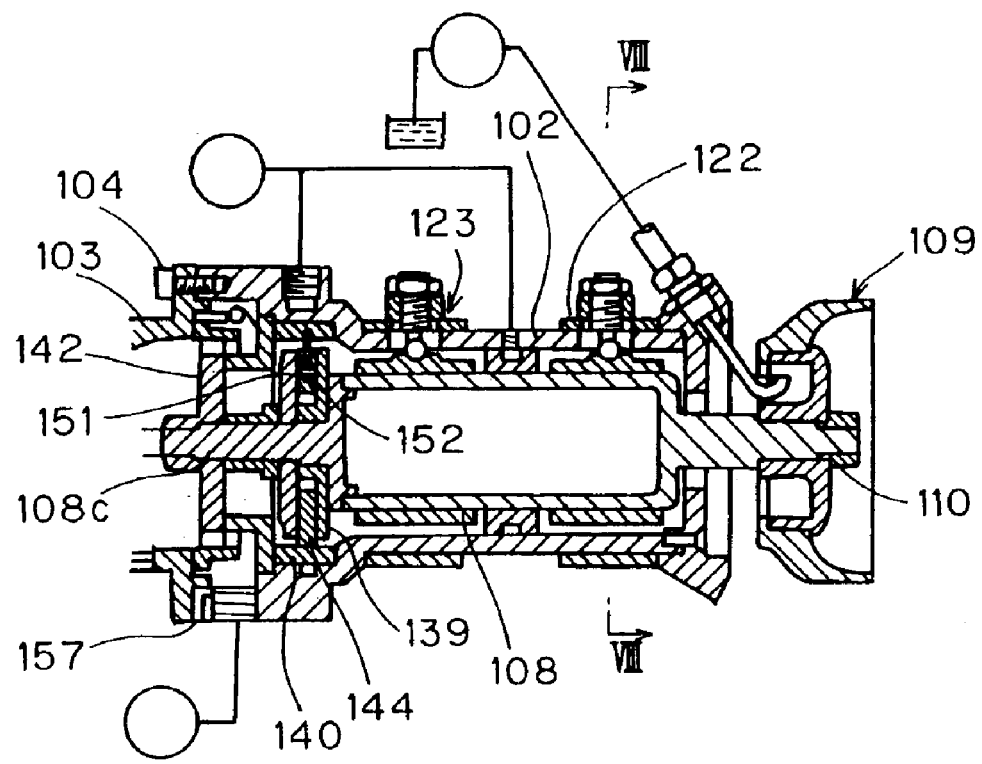
FIG. 17 is a longitudinal sectional view of a second prior art spindle device.
Figure 18:
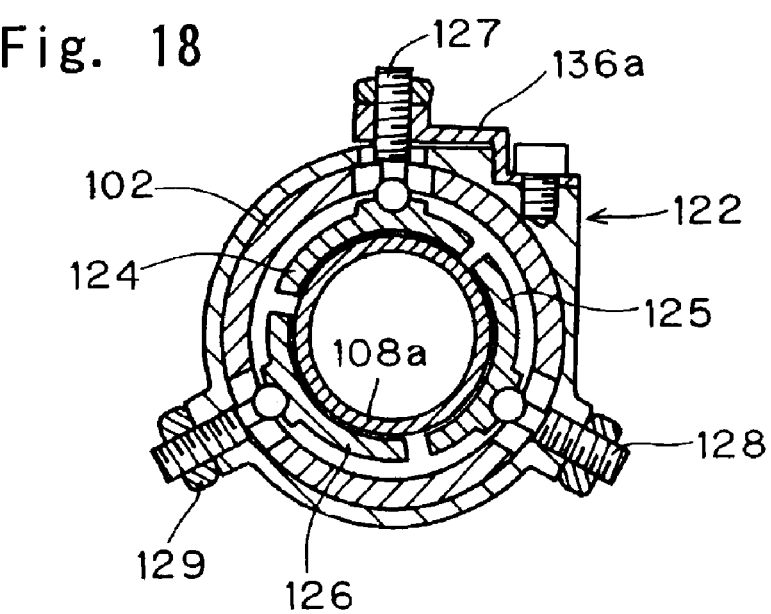
FIG. 18 is a cross-sectional view taken along the line VIII—VIII in FIG. 17.
Figure 19A:
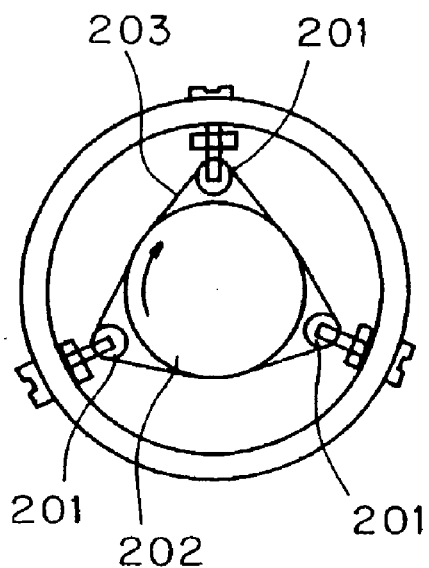
FIGS. 19A to 19C are transverse sectional views showing second to fourth prior art foil bearings.
Figure 19B:
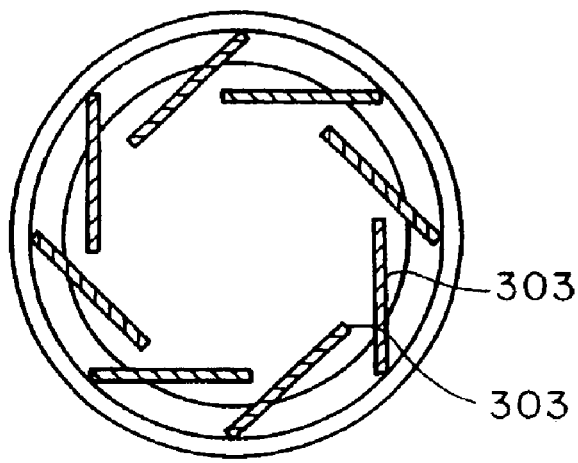
Figure 19C:
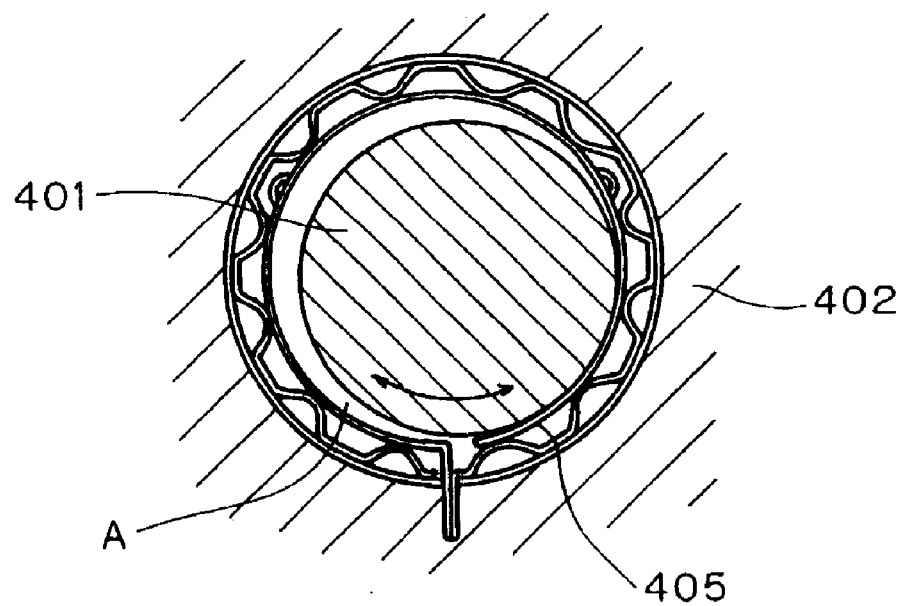

FIG. 15 illustrates a different manner of fixing each of the radial bearings 504. In the example shown in FIG. 15, the inner peripheral surface of the front separate housing 514 is formed with an axially extending groove 542 for each of the radial bearings 504, and a leaf spring 543 having a free end provided with a protuberance 544 is fixed in the axially extending groove 542. On the other hand, the outer peripheral surface of the bearing housing 1 for each of the radial bearings 504 is formed with a circumferentially extending groove 546 so that the protuberance 544 rigid or integral with the leaf spring 543 can be engaged in such circumferentially extending groove 546 to thereby fix the corresponding radial bearing 504 to the front separate housing 514.

Each of the thrust bearings 505 used in the spindle device may be the foil bearing of the structure according to the embodiment shown in FIG. 10.

The thrust bearings 505 of the structure described above are detachably secured, in the form of the corresponding bearing units 505A, to the front separate housing 514 and the rear separate housing 515, respectively, by means of suitable connecting means such as, for example, by the use of set screws. In operation, as the rotary shaft 4 rotates, an air pressure is developed in a manner similar to that in the radial bearings 504 to thereby support the rotary shaft 4 axially in a non-contact fashion.

The operation of the spindle device of the structure will now be described. When the rotary shaft 4 then rotating fluctuates, the bearing foils 3 and elastic members 2 of the radial bearings 504 and thrust bearings 505 undergo deformation a relatively large damping force is induced by the friction between the bearing foils 3 and the elastic members 2 and also between the elastic members 2 and the bearing housing 1. Because of this, even though the unbalance of the rotary shaft 4 is considerable, it is possible to drive the rotary shaft 4 to a high speed.

As hereinabove described, where the foil bearing is employed for each of the radial and thrust bearings 504 and 505, slight errors in shape and misalignment can be compensated for since each bearing surface can be deformed. Accordingly, as compared with the prior art spindle devices for electrostatic painting, machining and assembling requirements can advantageously be lessened. Also, each of the bearings 504 and 505 can be assembled into a unitary component, that is, the bearing unit 504A and 505A and can then be incorporated into the housing 502.

Also, since any component part need not have a wall of an increased wall thickness which would be required to avoid an undesirable deformation during machining and, also, since no bearing air passage such as used in an externally pressurized gas bearing is needed, the various component parts forming the spindle device can have a wall of a reduced wall thickness and, therefore, the spindle device can be assembled light-weight and compact in size.

As hereinbefore described, each of the radial bearings 504 is detachably fixed at a predetermined position inside the body housing 510 in the form of the corresponding bearing unit 504A including the bearing housing 1, the elastic member 2 and the bearing foil 3 assembled together, and each of the thrust bearings 505 is detachably fixed at a predetermined position inside the body housing 510 in the form of the corresponding bearing unit 505A including the bearing housing 1, the elastic member 2 and the bearing foil 3 assembled together. Accordingly, in the event that one or some of the bearings 504 and 505 fail to operate properly by an accident such as, for example, penetration of a liquid medium being processed, repair can be easily accomplished by merely replacing the malfunctioning bearing with a corresponding bearing unit 504A or 505A. It is to be noted that when at the time of replacement of one or some of the bearing units 504A and 505A, the liquid medium staining the rotary shaft 4 can be removed or washed away so that the rotary shaft 4 can be reused. Because of this feature, the spindle device embodying the present invention can be repaired in situ and need not therefore be returned to the manufacturer for repair, resulting in reduction of the maintenance cost.

In the spindle device, since a load resulting from unbalance acts in a radial direction, any possible damage resulting from, the unbalance may occur mainly in the bearing surface of the radial bearing 504. In the illustrated embodiment, however, since the elastic member 2 and the bearing foil 3 forming respective parts of the radial bearing 504 is fixed inside the bearing housing 1 by the effect of the frictional force, the rotary shaft 4 rotates together with the radial bearing 504 within the bearing housing 1 in the event that as a result of contact of the rotary shaft 4, then rotating, with the bearing foil 3 a torque larger than the frictional force is developed. Because of this, any possible damage to the rotary shaft 4 can advantageously be minimized.

The bearing surface of the bearing foil 3 confronting the rotary shaft 4 or the thrust plate 4a is, during a stationary condition of the rotary shaft, held in contact with the rotary shaft 4 or the thrust plate 4a and, even after the rotary shaft 4 starts its rotation, the bearing foil 3 keeps contact with the rotary shaft 4 or the thrust plate 4a until the speed of rotation of the rotary shaft 4 attains a value enough to develop a dynamic effect. In order to minimize a frictional wear which would occur in the bearing surface, the rotary shaft 4 and the bearing foil 3 are preferably heat treated to have an increased resistance to friction and/or an abrasion-resistant or lubricant film is preferably formed on sliding surfaces. As hereinbefore discussed, a nickel plating, a chrome plating, a vapor deposited film of titanium nitride or amorphous carbon can be employed for the abrasion-resistant film. Also, for the lubricant film, a plating in which solid lubricant particles such as molybdenum disulfide, graphite are dispersed, or a resin coating can be employed.

As hereinbefore described, in the spindle device of the kind discussed above, the load resulting from the unbalance acts in the radial direction and, therefore, as a spindle device according to an alternative embodiment, it may be contemplated to use the foil bearing of the structure shown in FIG. 3 or FIG. 1 in only the radial bearing 504 and to use the conventionally available bearing in the thrust bearing.

Although in describing the embodiment with reference to FIGS. 14 and 15 reference has been made to the spindle device used in the rotary atomizer for electrostatic painting, the present invention can be equally applied to any other spindle device of a kind utilizing an atomizer head mounted on the rotary shaft.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A foil bearing which comprises:
   an elastic member prepared from a wire net formed by braiding wires; and
   a thin bearing foil supported by the elastic member and defining an elasticbearing surface.

2. The foil bearing as claimed in claim 1, wherein the wires are thin metal wires and the bearing foil is made of a thin metal plate.

3. The foil bearing as claimed in claim 1, wherein the elastic member and a portion of the bearing foil are fixed together, and further comprising a bearing housing having a hollow defined therein, said elastic member being assembled into the hollow of the bearing housing while being elastically deformed, a subassembly of the elastic member and the bearing foil being fixed inside the bearing housing by means of an elastic force of restitution of the elastic member.

4. The foil bearing as claimed in claim 1, wherein the elastic member is formed into a cylindrical shape, and further comprising a bearing housing having a hollow defined therein, said elastic member being press-fitted into the hollow of the bearing housing.

5. The foil bearing as claimed in claim 1, wherein the elastic member is formed in a two-dimensional band, and further comprising a bearing housing having a hollow defined therein, said elastic member and the bearing foil being, after having been overlapped one above the other, curled to represent a cylindrical shape and then disposed within the hollow of the bearing housing.

6. The foil bearing as claimed in claim 1, wherein the elastic member has first and second opposite surfaces that are brought into contact with a bearing housing for supporting the elastic member and the bearing foil, respectively, at least one of the first and second surfaces of the elastic member being corrugated.

7. The foil bearing of a radial type as claimed in claim 1, further comprising a bearing housing having a hollow defined therein, the bearing housing having an inner peripheral surface formed with a key groove, and wherein the elastic member is formed to assume a cylindrical shape and is then fitted into the hollow of the bearing housing and is firmly connected with the bearing housing by means of a key.

8. The foil bearing as claimed in claim 1, wherein the elastic member is made up of a plurality of divided elastic segments arranged in a predetermined direction, each of the divided elastic segments having at least one of a different wire diameter and a different density of disposition of the wires.

9. The foil bearing as claimed in claim 1, wherein the elastic member has a density of disposition of the wires varying from one location to another.

10. The foil bearing as claimed in claim 1, wherein the foil bearing is of a thrust type.

11. A spindle device which comprises:
    a rotary shaft having a head mount to which an atomizer head is mounted; and
    radial and thrust bearings for supporting the rotary shaft for rotation relative to a housing;
    each of the radial and thrust bearings being a foil bearing as defined in claim 1, wherein the foil bearing comprises a bearing foil having a bearing surface confronting the rotary shaft and an elastic member interposed between the housing and the bearing foil to elastically support the bearing foil.

12. The spindle device as claimed in claim 11, wherein the number of the radial bearings is plural and the rotary shaft has a thrust plate, and wherein the thrust bearing is positioned to cooperate with each of opposite surfaces of the thrust plate in the rotary shaft.

13. The spindle device as claimed in claim 11, wherein the wires used in at least one of the foil bearings serving respectively as the radial and thrust bearings are thin metal wires.

14. The spindle device as claimed in claim 11, wherein the bearing foil and elastic member of the radial bearing are interconnected with each other to define a subassembly, said subassembly while being elastically deformed is inserted into the hollow of the housing and fixed in position within the housing by means of an elastic force of restitution of the elastic member.

15. The spindle device as claimed in claim 11, wherein the number of the radial bearings is plural and wherein the housing is divided into a bearing housing for supporting the elastic member and bearing foil of each of the radial bearings and a body housing in which the bearing housing is detachably mounted.

16. The spindle device as claimed in claim 15, wherein the body housing is divided into an outer casing and a separate housing detachably fitted to the outer casing and in which the respective bearing housings of the plural radial bearings are detachably mounted.

17. The spindle device as claimed in claim 11, wherein the spindle device is for use in a rotary atomizer wherein the atomizer head is operable to atomize a liquid medium by an effect of a centrifugal force; wherein the rotary shaft is a quill shaft having a hollow defined therein; wherein a nozzle for supplying the liquid medium towards the atomizer head for atomization is inserted into the hollow of the rotary shaft; wherein the rotary shaft has an outer periphery formed with a plurality of turbine blades; and wherein a turbine nozzle is provided in the housing for applying a compressed air to the turbine blades.

18. A spindle device which comprises:

a rotary shaft having a head mount to which an atomizer head is mounted; and a radial bearing for supporting the rotary shaft for rotation relative to a housing;

said radial bearing being a foil bearing as defined in claim 1, wherein the foil bearing comprises a bearing foil having a bearing surface confronting the rotary shaft and an elastic member interposed between the housing and the bearing foil to elastically support the bearing foil and the wires used in the foil bearing are thin metal wires.

* * * * *

UNITED STATES PATENT AND TRADEMARK OFFICE
CERTIFICATE OF CORRECTION

PATENT NO. : 6,848,828 B2
DATED : February 1, 2005
INVENTOR(S) : Hidehiko Nishijima et al.

It is certified that error appears in the above-identified patent and that said Letters Patent is hereby corrected as shown below:

Title page,
Item [56], References Cited, FOREIGN PATENT DOCUMENTS, change
"JP   58-87343   7/1979" to -- JP   54-87343   7/1979 --.

Column 19,
Line 47, change "elasticbearing" to -- elastic bearing --.

Signed and Sealed this

Ninth Day of August, 2005

JON W. DUDAS
*Director of the United States Patent and Trademark Office*